United States Patent [19]

Sabia

[11] 4,259,540

[45] * Mar. 31, 1981

[54] FILLED CABLES

[75] Inventor: Raffaele A. Sabia, Atlanta, Ga.

[73] Assignee: Bell Telephone Laboratories, Incorporated, Murray Hill, N.J.

[ * ] Notice: The portion of the term of this patent subsequent to Nov. 27, 1996, has been disclaimed.

[21] Appl. No.: 31,996

[22] Filed: Apr. 20, 1979

Related U.S. Application Data

[63] Continuation-in-part of Ser. No. 910,192, May 30, 1978, Pat. No. 4,176,240.

[51] Int. Cl.³ .............................................. H01B 7/28
[52] U.S. Cl. ......................... 174/23 C; 260/33.6 AQ; 350/96.23
[58] Field of Search ............. 260/33.6 AQ; 174/23 C; 350/96.23

[56] References Cited

U.S. PATENT DOCUMENTS

| | | | |
|---|---|---|---|
| 3,830,953 | 8/1974 | Wood et al. | 260/33.6 AQ |
| 3,870,575 | 4/1975 | Dobbin et al. | 174/23 C |
| 4,085,186 | 4/1978 | Rainer | 260/878 |
| 4,176,240 | 11/1979 | Sabia | 260/33.6 AQ |

Primary Examiner—Lewis T. Jacobs
Attorney, Agent, or Firm—Peter V. D. Wilde

[57] ABSTRACT

An improved filling material having superior handling characteristics and useful for waterproofing electrical cables is disclosed. The material is a styrene-ethylene butylene styrene block copolymer dissolved in a naphthenic or paraffinic oil, with polyethylene added for consistency.

8 Claims, 1 Drawing Figure

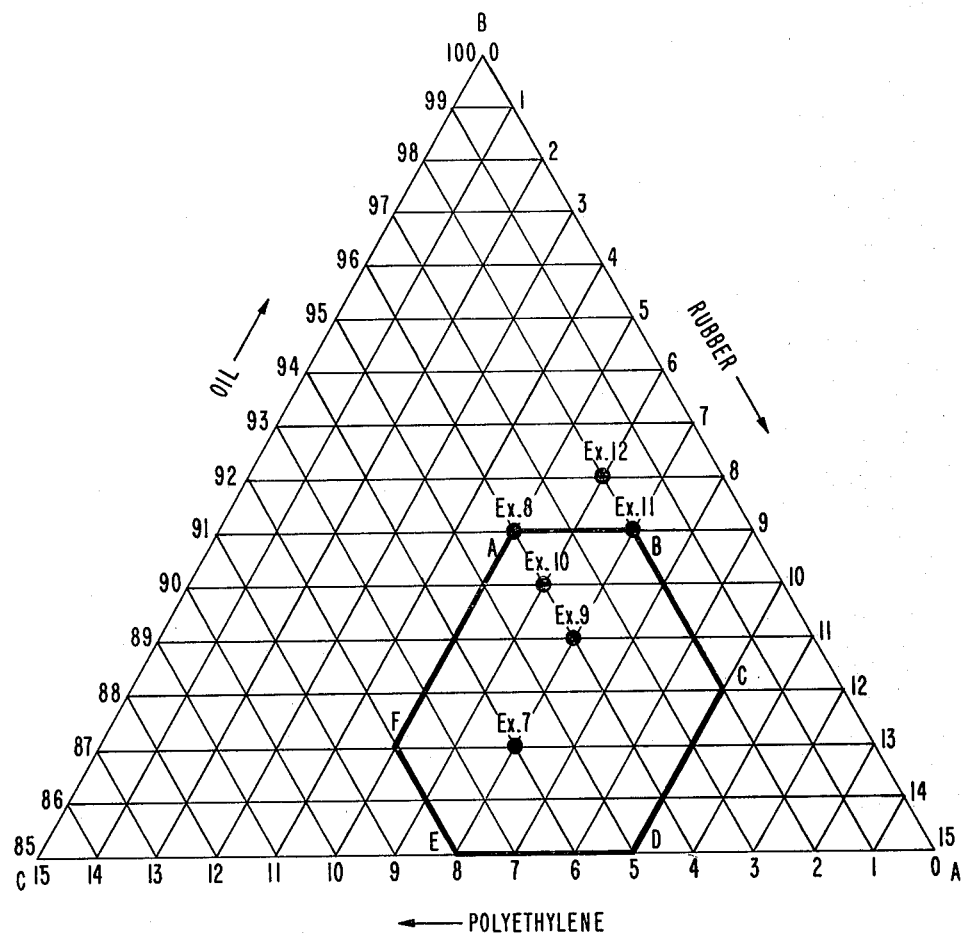

FILLED CABLES

CROSS-REFERENCE TO RELATED APPLICATION

This is a continuation-in-part of my copending application, Ser. No. 910,192, filed May 30, 1978, now U.S. Pat. 4,176,240, issued Nov. 27, 1979.

BACKGROUND OF THE INVENTION

Nearly all distribution cable now being installed in domestic telephone systems is buried beneath the ground. This represents a large investment in cable and the reliability of that cable as measured by maintenance costs and service continuity is an important factor. Most of the cable is waterproofed, because the most antagonistic environmental factor for buried cable is water.

Attempts to waterproof buried cable began nearly one hundred years ago and were unsuccessful in a practical sense until the introduction of plastic insulated cable (PIC) during the 1950's. Specially sheathed cables, with dual plastic coatings encasing an aluminum sheath have been used successfully and are still being buried in dry environments. Pressurized cable also contends successfully with water problems. However, both of these approaches are deficient, the former leaves the cable vulnerable and the latter is expensive to maintain. Since 1970, large quantities of cable have been filled with waterproofing compounds. This approach followed the recognition that in PIC cable the localized intrusion of water into the cable sheath is not in itself a serious problem. Disruption or deterioration of service occurs when long lengths of cable become flooded. Flooding occurs because water that penetrates into a localized opening in the cable sheath is free to channel as far as gravity allows, often hundreds of feet. Not only does this upset the capacitance balance of the transmission lines, but it introduces more potential corrosion sites in proportion to the length of wire that is wetted. Corrosion typically occurs slowly, but the useful life of water soaked wires is obviously shorter than that of dry wires.

The solution that has been widely adopted is to fill the voids in the cable with an insoluble filling material that simply plugs the cable to channeling water. However, though the physical function of the cable filling material is straightforward, the choice of the material is not. Among the many considerations that are important for materials used in this application are the hydrophobic nature of the material, stability on aging, low temperature properties, flow characteristics at elevated temperatures, processing characteristics, handling characteristics, dielectric properties, toxicity and cost.

Materials that satisfy most of these criteria, and which have been used widely in this application, are described in U.S. Pat. Nos. 3,607,487 and 3,717,716 issued Sept. 21, 1971 and Feb. 20, 1973 respectively. These materials are essentially a petroleum jelly, mixed with a polymer, usually polyethylene, to impart consistency and prevent flowing at warm temperatures.

Similar hydrophobic filling materials have been proposed for filling splice closures. For example, U.S. Pat. No. 3,879,575 issued Apr. 22, 1975 describes a mixture of a low viscosity oil gelled by a styrene-isoprene-styrene copolymer, again with polyethylene added to impart consistency and reduce slump.

SUMMARY OF THE INVENTION

This invention is essentially an improvement in the petroleum jelly-polyethylene cable filling material. That material has been found objectionable because of its handling characteristics. Installation and maintenance of cable requires the cable to be spliced. Distribution cables may contain several hundred wire pairs. Each wire must be isolated and spliced to another wire. When splicing cables that are filled with the petroleum jelly-polyethylene material, operating personnel are unable to avoid soiling hands, equipment and clothing. Moreover, removing just sufficient material from the wires to effect the splice is time consuming and the task is generally undesirable. Handling at low temperatures is significantly more difficult necessitating, on occasion, use of a torch to preheat the cable or solvents to soften the encapsulated core. Although from a technology standpoint the problem is pedestrian, from an economic standpoint, recognizing that the cost of telephone installation and repair is labor intensive, the acceptability and ease of the splicing task is a significant matter.

The improved material according to the invention is a mixture of: (1) an ASTM Type 103, 104A or 104B, or mixtures thereof, (napthenic or paraffinic) oil having a minimum sp. gr. of 0.860, a minimum SUS viscosity at 210 degrees F. of 45, a maximum pour point ASTM D 97 of 20 degrees F. and a maximum of 5 percent aromatic oils, (2) a styrene-ethylene butylene-styrene block copolymer having a styrene-rubber ratio of from approximately 0.2 to 0.5 and preferably approximately 0.4 and (3) polyethylene having a softening point of 110 degrees C. to 130 degrees C. (4) The amounts of the foregoing ingredients have been formulated in the proportions described below to give a cable filling material that meets the functional requirements of the cabling technology and has handling characteristics superior to those of the prior art materials. Other styrene block copolymers with a saturated midblock, such as hydrogenated polybutadiene, are also satisfactory.

BRIEF DESCRIPTION OF THE DRAWING

The FIGURE is a ternary compositional diagram giving the composition ranges of the cable filling material of the invention.

DETAILED DESCRIPTION

Various oil-polymer mixtures were formulated in arriving at the ingredients described above and the preferred proportions. The preferred proportions are indicated in the shaded area bounded by lines ABC-DEF of the FIGURE. Some of the test data used to arrive at this preferred compositional prescription are given in the following Table:

TABLE 1

| CON-STITUENTS | DESCRIPTION |
| --- | --- |
| A | Styrene-ethylene butylene-styrene block copolymer, styrene/rubber ratio 0.39 or 0.41, unplasticized, sp.gr.: 0.91, percent elongation 500, 300 percent modulus, ASTM |

TABLE 1-continued

| | | |
|---|---|---|
| B | | (D412) 700-800. Available from Shell Chemical Co. under trade designations Kraton G 1650,1652. |
| | | White mineral oil having pour point ASTM D97:0 degrees F., SUS viscosity at 210 degrees F.: 53.7, sp.gr.(ave) 0.884, maximum aromatic oils 1 percent. Available from Penreco, Penzoil Co. under trade designation Drakeol 35. (Examples 1-16) Paraffinic oil having a pour point ASTM D97: +15 degrees F. SUS viscosity at 210 degrees F.:49.5 sp.gr.(ave): 0.884, maximum aromatic oils 1%. Available from Shell Chemical Co. under trade designation Shellflex 310. (Examples 17 and 18) |
| C | | Polyethylene, softening point ASTM E-28: 116 degrees C.-117 degrees C. hardness ASTM D-5: 0.5-1.0 dmm, density ASTM D-1505: 0.93-0.94, viscosity 140 degrees C.: 400-450 cps. Available from Allied Chemical Corp under trade designations AC8, AC9. |

| Example No. | Parts by Weight Composition* | Viscosity at 100° C. | cps at 130° C. | Slump after 2 hrs in: 50° C. oven | 60° C. oven | 70° C. oven | Tear Strength lb/in. | Tensile Strength at Break, psi | Elongation percent |
|---|---|---|---|---|---|---|---|---|---|
| 1 | A-7 B-93 C-0 | 83 | 38 | Flowed | — | — | 0.14 | 0.8 | 68 |
| 2 | A-8 B-92 C-0 | 122 | 46 | Flowed | — | — | 0.20 | 1.3 | 78 |
| 3 | A-9 B-91 C-0 | 186 | 68 | Flowed | — | — | 0.28 | 1.7 | 95 |
| 4 | A-10 B-90 C-0 | 1,490 | 189 | No flow or Drip | Flowed | — | 0.45 | 3.3 | 101 |
| 5 | A-7 B-91 C-2 | 136 | 53 | Flowed | — | — | 0.22 | 2.6 | 129 |
| 6 | A-7 B-89 C-4 | 187 | 56 | No flow or Drip | No Flow or Drip | Flowed | 0.22 | 3.7 | 126 |
| 7 | A-7 B-87 C-6 | 292 | 64 | No flow or Drip | No Flow or Drip | No Flow or Drip | 0.27 | 4.9 | 117 |
| 8 | A-5 B-91 C-4 | 67 | 31 | No flow or Drip | Flowed | — | 0.11 | 1.4 | 93 |
| 9 | A-7 B-89 C-4 | 214 | 48 | No flow or Drip | No Flow or Drip | No Flow or Drip | — | — | — |
| 10 | A-6 B-90 C-4 | 137 | 40 | No flow or Drip | No Flow or Drip | none after 1½ hrs but slumped after 12 hours | — | — | — |
| 11 | A-7 B-91 C-2 | 148 | 45 | very little flow | slumped | — | — | — | — |
| 12 | A-6 B-92 C-2 | 93 | 35 | slumped to edge of pan | — | — | — | — | — |
| 13 | A-6 B-90 C-4** | 170 | 36 | Flowed | Flowed | Flowed | — | — | — |
| 14 | A-6 B-90 C-4*** | 563 | 35 | Flowed | Flowed | Flowed | — | — | — |
| 15 | A-6 B-88 C-6**** | 161 | 55 | Flowed | Flowed | — | — | — | — |
| 16 | A-6***** B-88 C-6 | 203 | 31 | Flowed | (tacky consistency) | — | — | — | — |

TABLE 1-continued

| 17 | A-6 | 70 | 33 | No flow | No flow | Flow | .63 | 2.8 | 180% |
|---|---|---|---|---|---|---|---|---|---|
|  | B-89 |  |  | or drip | or drip |  |  |  |  |
|  | C-4 |  |  |  |  |  |  |  |  |
|  | D-1.0****** |  |  |  |  |  |  |  |  |
| 18 | A-6 | 74 | 34 | No flow | No flow | No | .71 | 3.5 | 160% |
|  | B-88.6 |  |  | or drip | or drip | flow |  |  |  |
|  | C-4.8 |  |  |  |  | or |  |  |  |
|  | D-0.6****** |  |  |  |  | drip |  |  |  |

\*All compositions include (0.2 antioxidant-Irganox 1035)
\*\*polyethylene with softening pt of 129 degree C.
\*\*\*polyethylene with softening pt of 131 degrees C.
\*\*\*\*polyethylene with softening pt of 129 degrees C.
\*\*\*\*\*styrene-isoprene-styrene block copolymer
\*\*\*\*\*\*isopropyl phenyl-phenyl phosphate (Kronitex 100, FMC Corp.) for inhibiting syneresis
The syneresis inhibitor in Examples 17 and 18 is isopropyl phenyl, phenyl phosphate sold by FMC as Kronitex 100.

The compositions were evaluated in terms of three major considerations. The viscosity measurement indicates the processability of the material. Cables are filled by injecting the filling material into the voids between the wire pairs after the pairs are twisted. Therefore it is important that the material have a proper viscosity. The filling process involves elevated temperature. From the standpoint of the processing equipment and the effectiveness of the filling process it is more desirable to lower the viscosity of the filling material than to raise the temperature. The operating temperature is limited to the vicinity of 130 degrees C. by the insulation commonly used. Therefore further variation is obtained by choice of the composition. A maximum of 100 cps at 130 degrees C. has been imposed on the composition for acceptable processing. The second criterion appearing in the table is the slump characteristics after two hours exposure to three temperatures, 50 degrees, 60 degrees and 70 degrees C. This measures the retention of the filling material in an acceptably rigid state at elevated service temperatures. Mechanical data is also presented for some examples. The mechanical properties indicated were found to be adequate in nearly every case although it is preferred that the composition have a tear strength of at least 0.15 lb/in, a tensile strength at break of at least 1.15 psi and a percent elongation of at least 90.

The mechanical characteristics of the materials can be summarized in a subjective manner that is perhaps more meaningful. The prior art petroleum jelly material is a grease-like substance whereas the materials described here have a consistency resembling a soft gum eraser.

An important physical property of the material, its handleability, was discussed earlier. This property was evaluated subjectively and was one basis for choosing the styrene ethylene-butylene-styrene block copolymer over a styrene-isoprene-styrene copolymer. The latter gives a tacky compound (example 16). Another is flow at elevated temperatures and is the basis for choosing composition limits. The compositions of Examples 7, 9, and 10 were especially desirable from a slump standpoint. The compositions of Examples 8 and 11 were considered just marginally adequate while the composition of Example 12 was considered inadequate.

Examples 13-15 were tests to determine the limitations on the polyethylene constituent. All of these compositions contained polyethylene with a softening point outside the range of 110 degrees-130 degrees C. (ASTM E-28) and slumped excessively.

Based on experience with these formulations I would predict that compositions having high styrene contents would be sufficiently rigid that the polyethylene constituent can be eliminated. The increased rigidity improves the slump characteristics of the gel, and is the reason for adding the polyethylene originally.

Extended experience with these cable filling compounds revealed that some of the formulations, under some test conditions, exhibited oil syneresis. We therefore recommend that when oil syneresis occurs, and if it is adjudged to be a problem, that a syneresis inhibitor be added. The syneresis inhibitor is preferably a plasticizer for polystyrene. Effective plasticizers are alkyl ether phosphates, di(alkyl ether)ester, phosphate esters, poly(alkene oxy)glycol diesters, alkyl-alkyl ether diester, di(alkene oxy)glycol diesters, alkyl ether monoesters, and aromatic diesters. Several materials in the category were tested in the formulations of this invention. Preferred plasticizers were formed to be phosphate esters (trifunctional) and in particular, tricresyl phosphate, trioctyl phosphate, and isopropyl phenyl-phenyl phosphate. Amounts in excess of 0.2% appear to be effective. Above 2% the additive tends to degrade the dielectric properties.

Although this description deals with electrical cables, it will be evident to those skilled in the art that it is equally applicable to cables containing light conductors.

Various additional modifications and extensions of this invention will become apparent to those skilled in the art. All such variations and deviations which basically rely on the teachings through which this invention has advanced the art are properly considered to be within the spirit and scope of this invention.

I claim:

1. A cable comprising:
   a plurality of conductors contained within a sheath leaving voids between the conductors, and between the conductors and the sheath, and a filling material filling the voids the invention characterized in that the filling material comprises a mixture of:
   (X) an ASTM Type 103, 104A or 104B, or mixtures thereof, (paraffinic or naphthenic) oil, having a minimum sp. gr. of 0.860, a minimum SUS viscosity at 210 degrees F. of 45, a maximum pour point ASTM D 97 of 20 degrees F. and a maximum of 5 percent aromatic oils,
   (Y) a styrene-ethylene butylene-styrene block copolymer having a styrene-rubber ratio of approximately 0.2 to 0.5,
   (Z) polyethylene having a softening point of 110 degrees C. to 130 degrees C.
   the ingredients X, Y and Z having relative proportions falling within the shaded area bounded by ABCDEF of the FIGURE.

2. The cable of claim 1 in which the conductors are electrical conductors.

3. The cable of claim 1 in which the conductors are light conductors.

4. The cable of claim 1 in which the filling material additionally contains 0.2–2% of a syneresis inhibitor.

5. The cable of claim 4 in which the filling material additionally contains an antioxidant.

6. The cable of claim 5 in which the styrene-rubber ratio is approximately 0.4.

7. An encapsulating compound comprising a mixture of:
 (X) an ASTM Type 103, 104A or 104B, or mixtures thereof, (paraffinic or naphthenic) oil, having a minimum sp. gr. of 0.860, a minimum SUS viscosity at 210 degrees F. of 45, a maximum pour point ASTM D 97 of 20 degrees F. and a maximum of 5 percent aromatic oils,
 (Y) a styrene-ethylene butylene-styrene block copolymer having a styrene-rubber ratio of approximately 0.2 to 0.5,
 (Z) polyethylene having a softening point of 110 degrees C. to 130 degrees C.,
 the ingredients X, Y and Z having relative proportions falling within the shaded area bounded by ABCDEF of the FIGURE.

8. The compound of claim 7 in which the styrene-rubber ratio is approximately 0.4.

* * * * *